(12) United States Patent
Oh et al.

(10) Patent No.: US 11,513,948 B2
(45) Date of Patent: Nov. 29, 2022

(54) CONTROLLER AND MEMORY SYSTEM

(71) Applicant: SK hynix Inc., Gyeonggi-do (KR)

(72) Inventors: Yong Seok Oh, Gyeonggi-do (KR);
Youngho Ahn, Gyeonggi-do (KR);
Joon Ho Lee, Gyeonggi-do (KR);
Chang Eun Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/018,404

(22) Filed: Sep. 11, 2020

(65) Prior Publication Data

US 2021/0294739 A1 Sep. 23, 2021

(30) Foreign Application Priority Data

Mar. 17, 2020 (KR) ........................ 10-2020-0032456

(51) Int. Cl.
*G06F 12/02* (2006.01)
*G06F 12/08* (2016.01)
*G06F 9/54* (2006.01)
*G06F 11/30* (2006.01)
*G06F 12/0815* (2016.01)

(52) U.S. Cl.
CPC .......... *G06F 12/0246* (2013.01); *G06F 9/546* (2013.01); *G06F 11/3037* (2013.01); *G06F 12/0815* (2013.01); *G06F 2212/7201* (2013.01); *G06F 2212/7211* (2013.01)

(58) Field of Classification Search
CPC .. G06F 12/0246; G06F 11/3037; G06F 9/546; G06F 12/0815; G06F 2212/7201; G06F 2212/7211
See application file for complete search history.

(56) References Cited

U.S. PATENT DOCUMENTS

| 2013/0042054 | A1* | 2/2013 | Jung | G06F 12/0246 |
| | | | | 711/103 |
| 2017/0102950 | A1 | 4/2017 | Chamberlain et al. | |
| 2019/0163623 | A1* | 5/2019 | Bae | G06F 3/0608 |
| 2019/0179741 | A1* | 6/2019 | Liu | G06F 3/0679 |
| 2019/0378591 | A1* | 12/2019 | Kanno | G06F 12/0246 |
| 2020/0042181 | A1* | 2/2020 | Lee | G06F 12/0246 |

FOREIGN PATENT DOCUMENTS

KR 10-2016-0150451 12/2016

* cited by examiner

*Primary Examiner* — Masud K Khan
(74) *Attorney, Agent, or Firm* — IP & T Group LLP

(57) ABSTRACT

A memory system includes a first memory device including a plurality of first physical blocks; a second memory device including a plurality of second physical blocks; a first core suitable for managing a plurality of first super blocks that store data associated with a first logical address, the plurality of first super blocks being mapped to the plurality of first physical blocks; a second core suitable for managing a plurality of second super blocks that store data associated with a second logical address, the plurality of second super blocks being mapped to the plurality of second physical blocks; a global wear-leveling manager suitable for changing mapping between the first physical blocks, which are mapped to one among the first super blocks, and the second physical blocks, which are mapped to one among the second super blocks based on degrees of wear of the first and second super blocks.

14 Claims, 10 Drawing Sheets

FIG. 6A 144-1

| LA | VA | |
| --- | --- | --- |
| | BLOCK | PAGE |
| 1 | 1 | 1 |
| 5 | 1 | 2 |
| 9 | 1 | 3 |
| 13 | 2 | 1 |
| 17 | 2 | 2 |
| ... | ... | ... |

FIG. 6B 144-5

| SB | | PBs | | | | | | | |
| --- | --- | --- | --- | --- | --- | --- | --- | --- | --- |
| | | DIE1 | | DIE2 | | DIE3 | | DIE4 | |
| CORE | BLOCK | DEVICE | BLOCK | DEVICE | BLOCK | DEVICE | BLOCK | DEVICE | BLOCK |
| 1 | 1 | 1 | 1 | 1 | 1 | 1 | 1 | 1 | 1 |
| 1 | 2 | 2 | 5 | 2 | 5 | 2 | 4 | 2 | 5 |
| 1 | 3 | 1 | 4 | 1 | 3 | 1 | 3 | 1 | 4 |
| 1 | 4 | 1 | 5 | 1 | 4 | 1 | 5 | 1 | 5 |
| 1 | 5 | 1 | 6 | 1 | 5 | 1 | 6 | 1 | 6 |
| ... | ... | ... | ... | ... | ... | ... | ... | ... | ... |
| 2 | 1 | 2 | 1 | 2 | 1 | 2 | 1 | 2 | 1 |
| 2 | 2 | 2 | 2 | 2 | 2 | 2 | 2 | 2 | 3 |
| 2 | 3 | 2 | 3 | 2 | 3 | 2 | 3 | 2 | 4 |
| 2 | 4 | 2 | 4 | 2 | 4 | 2 | 5 | 2 | 6 |
| 2 | 5 | 1 | 2 | 1 | 2 | 1 | 2 | 1 | 2 |
| ... | ... | ... | ... | ... | ... | ... | ... | ... | ... |

FIG. 6C 144-5

| SB | | SB | |
|---|---|---|---|
| CORE | BLOCK | CORE | BLOCK |
| 1 | 2 | 2 | 5 |
| ... | ... | ... | ... |

| SB | | PBs | | | | | | | |
|---|---|---|---|---|---|---|---|---|---|
| | | DIE1 | | DIE2 | | DIE3 | | DIE4 | |
| CORE | BLOCK | DEVICE | BLOCK | DEVICE | BLOCK | DEVICE | BLOCK | DEVICE | BLOCK |
| 1 | 1 | 1 | 1 | 1 | 1 | 1 | 1 | 1 | 1 |
| 1 | 2 | 2 | 5 | 2 | 5 | 2 | 4 | 2 | 5 |
| 1 | 3 | 1 | 4 | 1 | 3 | 1 | 3 | 1 | 4 |
| 1 | 4 | 1 | 5 | 1 | 4 | 1 | 5 | 1 | 5 |
| 1 | 5 | 1 | 6 | 1 | 5 | 1 | 6 | 1 | 6 |
| ... | ... | ... | ... | ... | ... | ... | ... | ... | ... |

CONTROLLER AND MEMORY SYSTEM

CROSS-REFERENCE TO RELATED APPLICATION(S)

The present application claims priority under 35 U.S.C. § 119(a) to Korean Patent Application No. 10-2020-0032456, filed on Mar. 17, 2020, the disclosure of which is incorporated herein by reference in its entirety.

BACKGROUND

1 Field

Various embodiments of the present disclosure generally relate to a memory system. Particularly, the embodiments relate to a controller for controlling a memory device and a memory system for controlling the memory device.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid-state drives (SSD).

SUMMARY

Various embodiments of the present disclosure are directed to a memory system and an operating method thereof, which may balance the degrees of wear of memory blocks included in different memory devices.

In accordance with an embodiment, a memory system includes: a first memory device including a plurality of first physical blocks; a second memory device including a plurality of second physical blocks; a first core suitable for managing a plurality of first super blocks that store data associated with a first logical address, the plurality of first super blocks being mapped to the plurality of first physical blocks; a second core suitable for managing a plurality of second super blocks that store data associated with a second logical address, the plurality of second super blocks being mapped to the plurality of second physical blocks; a global wear-leveling manager suitable for changing mapping between the first physical blocks, which are mapped to one among the first super blocks, and the second physical blocks, which are mapped to one among the second super blocks based on degrees of wear of the first and second super blocks; and a host interface suitable for sorting logical addresses, which are received from a host, into the first and second logical addresses, providing the first core with the first logical address, and providing the second core with the second logical address.

In accordance with another embodiment, a controller that controls a first memory device and a second memory device, the controller includes: a first core suitable for managing a plurality of first super blocks that store data associated with a first logical address, the plurality of first super blocks being mapped to a plurality of first physical blocks included in the first memory device; a second core suitable for managing a plurality of second super blocks that store data associated with a second logical address, the plurality of second super blocks being mapped to a plurality of second physical blocks included in the second memory device; a global wear-leveling manager suitable for mapping the first physical blocks, which are mapped to one among the first super blocks, to the second physical blocks, which are mapped to one among the second super blocks, based on degrees of wear of the first and second super blocks; and a host interface suitable for sorting logical addresses, which are received from a host, into the first logical address and the second logical address, providing the first core with the first logical address, and providing the second core with the second logical address.

In accordance with still another embodiment, a memory system includes: a plurality memory devices including first and second groups of memory units, the first and second groups being exclusively assigned respectively to a first core and a second core; the first core and the second core suitable for controlling the memory devices to perform local wear-leveling operations on the first and second groups, respectively; and a global wear-leveling manager suitable for exchanging, based on degrees of wear of the respective memory units, the exclusive assignments of one or more memory units between the first core and the second core.

In accordance with yet another embodiment, an operating method of a memory system including a plurality of memory devices including first and second groups of memory units, the operating method includes: exclusively assigning the first and second groups respectively to first and second cores; controlling, by the first and second cores, the memory devices to perform local wear-leveling operations on the first and second groups, respectively; and exchanging, based on degrees of wear of the respective memory units, the exclusive assignments of one or more memory units between the first and second cores.

These and other features and advantages of the claimed invention will become apparent to those with ordinary skill in the art of the invention from the following drawings and detailed description.

BRIEF DESCRIPTION OF THE DRAWINGS

FIGS. 6A to 6C are examples of address mapping tables of the memory system illustrated in FIG. 5.

FIG. 8 is an example of an address mapping table of the memory system illustrated in FIG. 7.

DETAILED DESCRIPTION

Hereinafter, various embodiments of the present disclosure will be described below in detail with reference to the accompanying drawings. In the following description, only parts necessary for understanding the operation according to the present embodiments will be described, and the description of other parts may be omitted so as not to obscure the subject matter of the present embodiments.

The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention. Unless otherwise defined, all terms including technical and scientific terms used herein have the same meaning as commonly understood by one of ordinary skill in the art to which the present invention belongs in view of the present disclosure.

It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

It should also be noted that features present in one embodiment may be used with one or more features of another embodiment without departing from the scope of the invention.

It is further noted, that in the various drawings, like reference numbers designate like elements.

Figure 1:
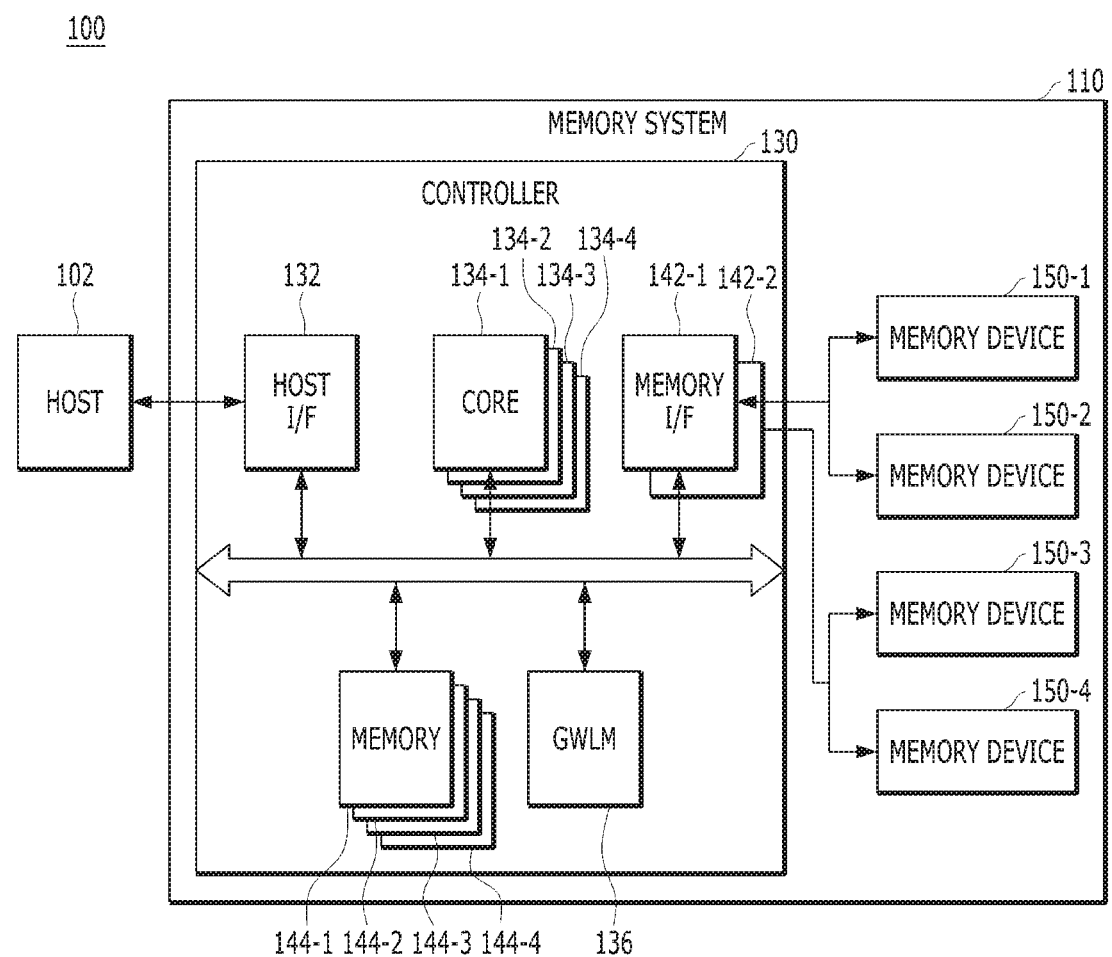
FIG. 1 is a block diagram illustrating a data processing system including a memory system in accordance with an embodiment.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control the overall functions and operations of the host 102, and provide operation between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid-state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC), micro-MMC, and the like. The SD card may include a mini-SD card and a micro-SD card.

The memory system 110 may be embodied as various types of storage devices. Examples of such storage devices may include, but are not limited to, volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a plurality of memory devices 150-1, 150-2, 150-3 and 150-4. The plurality of memory devices 150-1, 150-2, 150-3 and 150-4 may store data for the host 102, and the controller 130 may control the data storage into the plurality of memory devices 150-1, 150-2, 150-3 and 150-4.

The controller 130 and the plurality of memory devices 150-1, 150-2, 150-3 and 150-4 may be integrated into a single semiconductor device. For example, the controller 130 and the plurality of memory devices 150-1, 150-2, 150-3 and 150-4 may be integrated as one semiconductor device to constitute a solid-state drive (SSD). When the memory system 110 is used as an SSD, the operating speed of the host 102 connected to the memory system 110 can be improved. In addition, the controller 130 and the plurality of memory devices 150-1, 150-2, 150-3 and 150-4 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC), micro-MMC, secure digital (SD) card including mini-SD card, micro-SD card and SDHC card, or universal flash storage (UFS) device.

The plurality of memory devices 150-1, 150-2, 150-3 and 150-4 may be a nonvolatile memory device and may retain data stored therein even though power is not supplied. The memory device 150 may store data provided from the host 102 through a program operation, and provide data stored therein to the host 102 through a read operation. The plurality of memory devices 150-1, 150-2, 150-3 and 150-4 may include a plurality of memory blocks each of which may include a plurality of pages, and each of the pages may include a plurality of memory cells coupled to a word line. In an embodiment, the plurality of memory devices 150-1, 150-2, 150-3 and 150-4 may be a flash memory. The flash memory may have a 3-dimensional (3D) stack structure.

Figure 2:
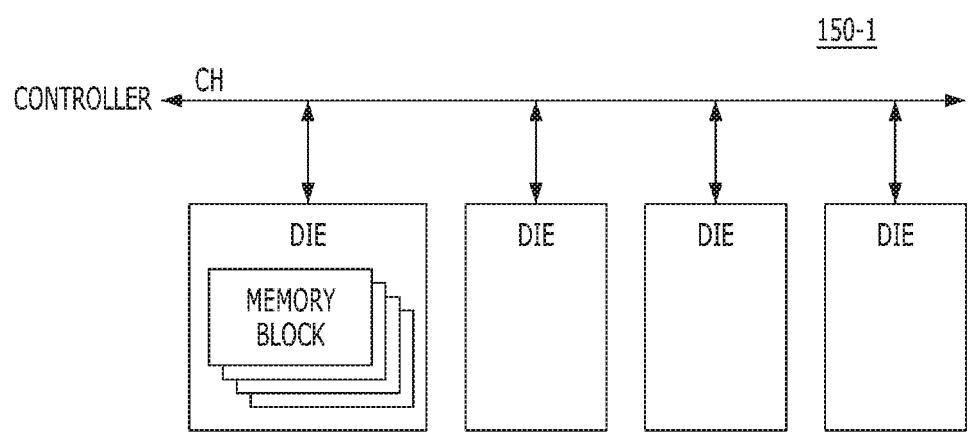
FIG. 2 is a block diagram illustrating an example of a memory device.

FIG. 2 is a block diagram illustrating an example of the memory device 150-1.

FIG. 2 representatively illustrates the first memory device 150-1 among the plurality of memory devices 150-1, 150-2, 150-3 and 150-4 included in the memory system 110 of FIG. 1.

The first memory device 150-1 may include a plurality of memory dies DIEs. For example, each of the memory dies DIEs may be a NAND memory die. The memory dies DIEs may be connected to the controller 130 through a channel CH. The number of dies may vary by design.

Each of the memory dies DIEs may have a hierarchical structure consisting of planes, memory blocks and pages. A memory die DIE may receive one command at a time. A memory die DIE may include a plurality of planes, and the plurality of planes may process each command received in parallel. Each of the planes may include a plurality of physical blocks. Each of the physical blocks may be a minimum unit of an erase operation. One physical block may include a plurality of pages. Each of the pages may be a minimum unit of a write operation. The plurality of memory dies DIEs may operate in parallel with one another.

The structures of the second to fourth memory devices 150-2, 150-3 and 150-4 may be substantially the same as or similar to those of the first memory device 150-1. The plurality of memory devices 150-1, 150-2, 150-3 and 150-4 may operate in parallel with one another.

Referring back to FIG. 1, the controller 130 may include a host interface 132, a plurality of cores 134-1, 134-2, 134-3 and 134-4, a plurality of memory interfaces 142-1 and 142-2, a plurality of memories 144-1, 144-2, 144-3 and 144-4, and a global wear-leveling manager (GWLM) 136 that are all operatively coupled via an internal bus.

In order to provide high data input/output performance, the memory system 110 may include the plurality of cores 134-1, 134-2, 134-3 and 134-4 that operate in parallel with one another. Each of the cores 134-1, 134-2, 134-3 and 134-4 may drive firmware, which is referred to as a flash translation layer (FTL).

The FTL is the firmware used between a file system of the host 102 and the flash memory. The flash memory may provide a fast read speed at a relatively low unit cost compared to other memory devices. However, since the flash memory does not support an overwrite operation, an erase operation has to be performed first in order to write data to the flash memory. Also, the unit of data to be erased is larger than the unit of data to be written to the flash memory. When the memory system 110 including the flash memory is used as a storage device of the host 102, the file system for a hard disk may not be utilized as it is, due to the erase characteristics. Therefore, the FTL may be used between the file system and the flash memory.

The cores 134-1, 134-2, 134-3 and 134-4 may be implemented as a microprocessor or a central processing unit (CPU).

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through firmware referred to as a host interface layer (HIL) in order to exchange data with the host.

The host interface 132 may receive requests from the host 102 and logical addresses corresponding to the requests. For example, the logical addresses may be logical block addresses LBA used in the file system of the host 102.

The host interface 132 may distribute the requests to the cores 134-1, 134-2, 134-3 and 134-4 based on the logical addresses. For example, the host interface 132 may provide the cores 134-1, 134-2, 134-3 and 134-4 with the requests according to a result value obtained by performing a modulo operation on the logical addresses.

The plurality of memory I/Fs 142-1 and 142-2 may serve as a memory/storage interface for interfacing the controller 130 and the plurality of memory devices 150-1, 150-2, 150-3 and 150-4 such that the controller 130 controls the plurality of memory devices 150-1, 150-2, 150-3 and 150-4 in response to a request from the host 102. When the plurality of memory devices 150-1, 150-2, 150-3 and 150-4 is a flash memory or specifically a NAND flash memory, the plurality of memory I/Fs 142-1 and 142-2 may generate a control signal for the memory device 150 and process data to be provided to the plurality of memory devices 150-1, 150-2, 150-3 and 150-4 under the control of the plurality of cores 134-1, 134-2, 134-3 and 134-4. The plurality of memory I/Fs 142-1 and 142-2 may work as an interface (e.g., a NAND flash interface) for processing a command and data between the controller 130 and the plurality of memory devices 150-1, 150-2, 150-3 and 150-4. Specifically, the plurality of memory I/Fs 142-1 and 142-2 may support data transfer between the controller 130 and the plurality of memory devices 150-1, 150-2, 150-3 and 150-4.

The plurality of cores 134-1, 134-2, 134-3 and 134-4 may control the plurality of memory devices 150-1, 150-2, 150-3 and 150-4 through the plurality of memory interfaces 142-1 and 142-2. Each of the cores 134-1, 134-2, 134-3 and 134-4 may access physical blocks exclusively allocated to itself. For example, when the first core 134-1 accesses physical blocks included in the first memory device 150-1, the second to fourth cores 134-2, 134-3 and 134-4 may not access these physical blocks.

The plurality of memories 144-1, 144-2, 144-3 and 144-4 may serve as operating memories of the memory system 110 and the controller 130, and store therein data for driving the memory system 110 and the controller 130. For example, the first memory 144-1 may store therein data necessary for the first core 134-1 to perform an operation. Similarly, the second to fourth memories 144-2, 144-3 and 144-4 may store therein data necessary for the second to fourth cores 134-2, 134-3 and 134-4 to perform operations, respectively.

The plurality of memories 144-1, 144-2, 144-3 and 144-4 may be implemented as volatile memories. For example, each of the memories 144-1, 144-2, 144-3 and 144-4 may be implemented as a static random access memory (SRAM) or a dynamic random access memory (DRAM). The memories 144-1, 144-2, 144-3 and 144-4 may be disposed inside or outside the controller 130. FIG. 1 shows as an example the memories 144-1, 144-2, 144-3 and 144-4 disposed inside the controller 130. In some embodiments, the memories 144-1, 144-2, 144-3 and 144-4 may be implemented as external volatile memory devices having memory interfaces for inputting and outputting data between the memories 144-1, 144-2, 144-3 and 144-4 and the controller 130.

The cores 134-1, 134-2, 134-3 and 134-4 may perform an operation corresponding to a request received from the host interface 132, that is, a foreground operation. For example, the first core 134-1 may control the first memory device 150-1 to program data into the physical blocks of the first memory device 150-1 in response to a write request of the host interface 132, and control the first memory device 150-1 to read data from the physical blocks of the first memory device 150-1 in response to a read request of the host interface 132.

In addition, the cores 134-1, 134-2, 134-3 and 134-4 may perform a background operation on the memory devices 150-1, 150-2, 150-3 and 150-4, respectively.

The plurality of physical blocks included in the memory devices 150-1, 150-2, 150-3 and 150-4 may have limited lifespans. Accordingly, when the erase operation is performed on a specific physical block for a predetermined number of times, the physical block may no longer be used. Each of the cores 134-1, 134-2, 134-3 and 134-4 may perform a local wear-leveling operation, as a background operation, on the physical blocks exclusively allocated to itself.

When each of the cores 134-1, 134-2, 134-3 and 134-4 perform just the local wear-leveling operation on the physical blocks exclusively allocated to itself, it is difficult to balance the degrees of wear of all the physical blocks of the memory system 110. This is because the amount of requests distributed to each of the cores 134-1, 134-2, 134-3 and 134-4 may vary depending on logical addresses associated with the requests provided from the host 102.

Even though the amounts of requests provided to the respective cores 134-1, 134-2, 134-3 and 134-4 are different from one another, the degrees of wear of physical blocks exclusively allocated to the same core may be balanced by the local wear-leveling operation. However, it is difficult to balance the degrees of wear of physical blocks exclusively allocated to different cores. For example, when different cores exclusively access different memory devices, it is difficult to balance the degrees of wear of physical blocks included in the different memory devices. Moreover, when physical blocks of a specific memory device reach the end of their lifespans earlier than those of remaining memory devices, the entire memory system 110 may not be normally used even though the physical blocks of the remaining memory devices are still available.

When the host interface 132 swaps logical addresses associated with different cores, the frequencies of serving requests by respective cores may be balanced, the requests being provided after the swap of the logical addresses. However, an already broken balance of the degrees of wear of physical blocks may not be recovered despite the swap performed after the balance is broken. Therefore, the swap of the logical addresses may not be enough to effectively balance the degrees of wear of physical blocks exclusively allocated to different cores.

According to a present embodiment, the global wear-leveling manager 136 may perform a global wear-leveling operation of swapping physical blocks exclusively allocated to the respective cores 134-1, 134-2, 134-3 and 134-4. The global wear-leveling operation according to the present embodiment will be described in detail with reference to FIGS. 3 to 5.

In this disclosure, the global wear-leveling operation of swapping physical blocks exclusively allocated to respective first and second cores may mean an operation of exchanging the exclusive allocation of the physical blocks between the first and second cores. For example, when a first group of physical blocks are exclusively assigned to the first core and a second group of physical blocks are exclusively assigned to the second core, the first and second parties may belong respectively to first and second memory devices respectively controlled by the first and second cores. Through the global wear-leveling operation, the exclusive assignment of the first group may be changed to the second core and the exclusive assignment of the second group may be changed to the first core. When the first and second parties are respectively first and second super blocks, the exclusive assignments of the first and second super blocks may be exchanged between the first and second cores through the global wear-leveling operation.

Figure 3:
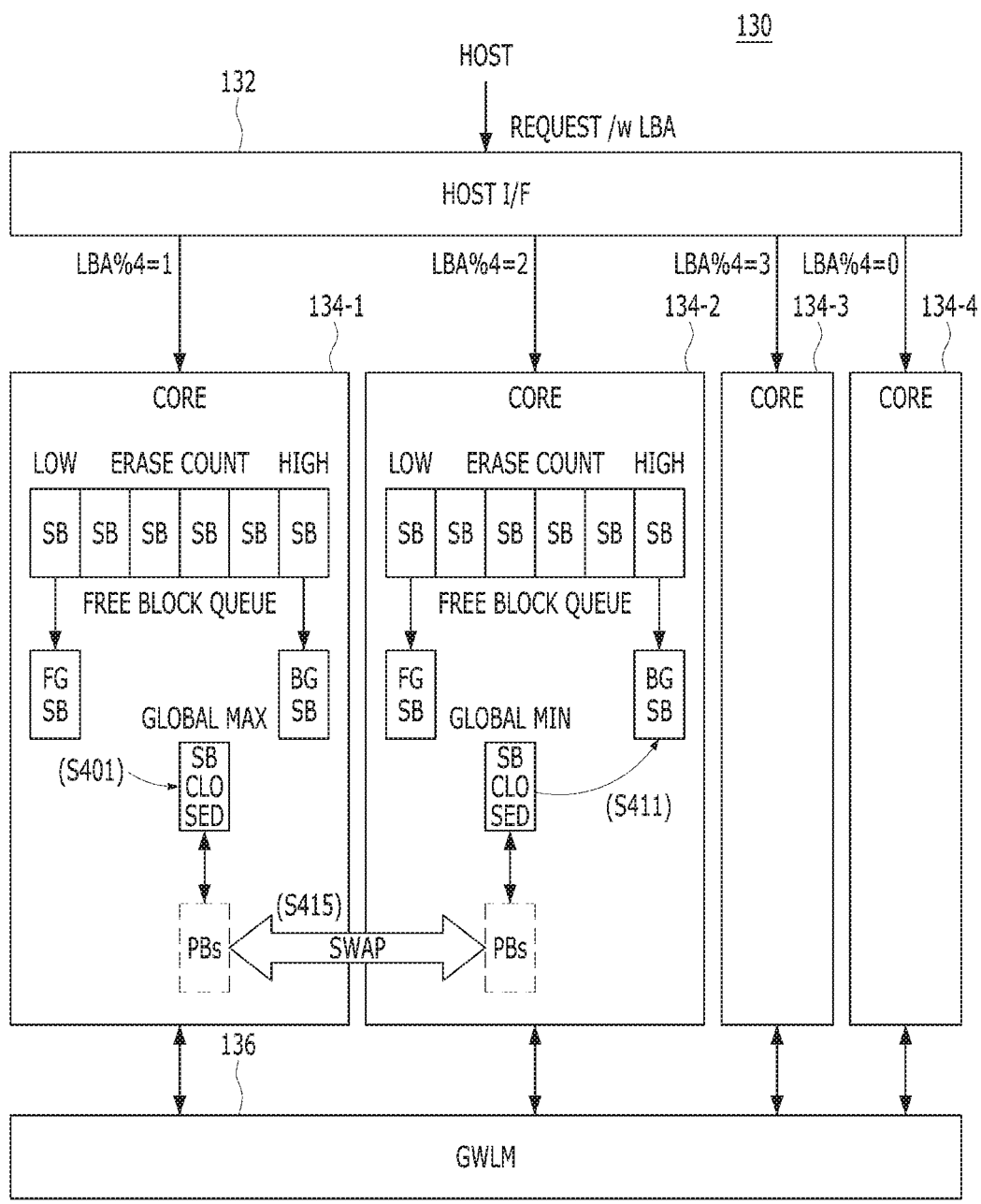
FIGS. 3 and 4 are diagrams illustrating an operation of a memory system in accordance with an embodiment.
Figure 4:
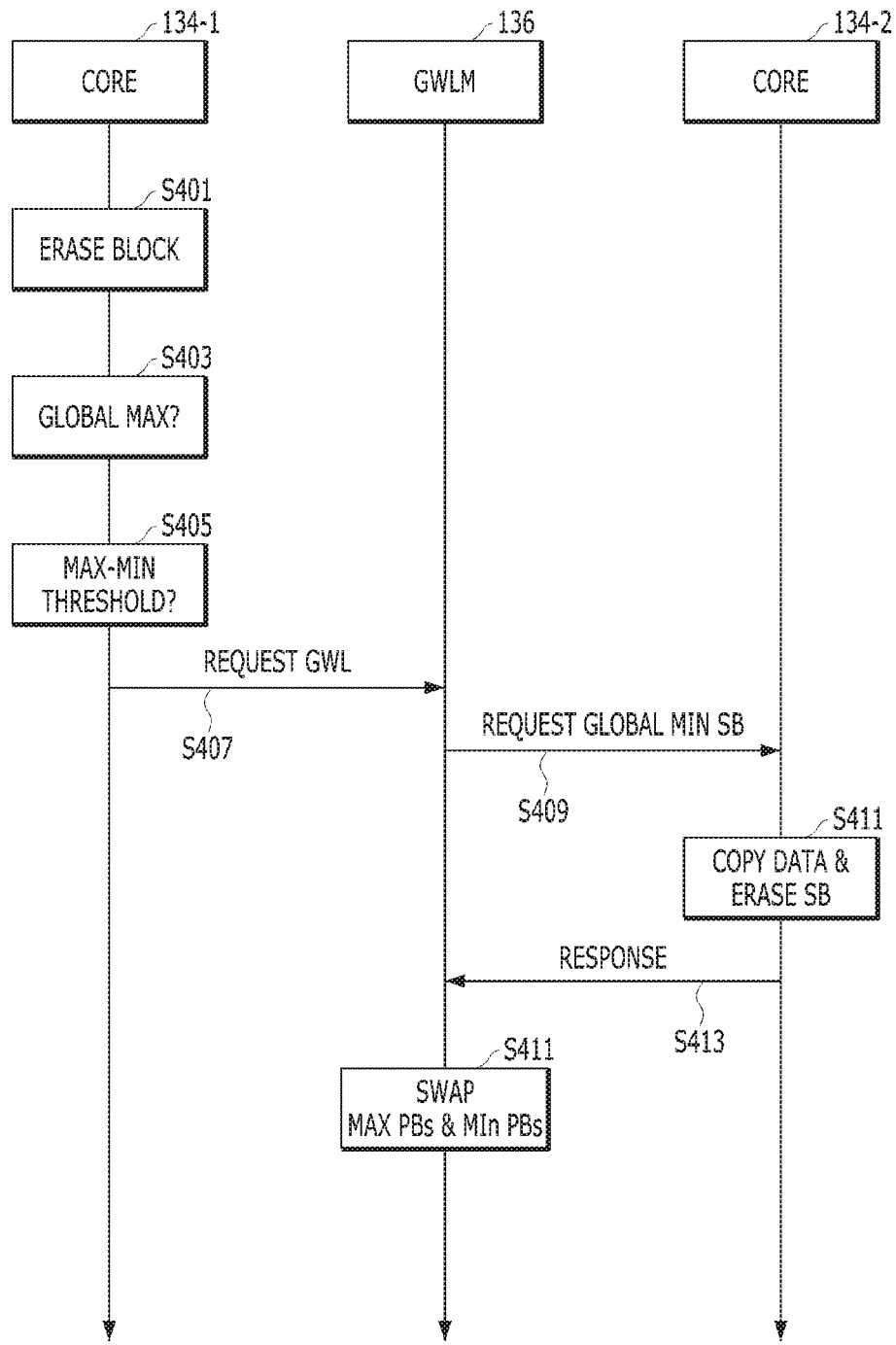

FIGS. 3 and 4 are diagrams illustrating an operation of the memory system 110 in accordance with an embodiment of the present invention.

FIG. 3 illustrates the host interface 132, the plurality of cores 134-1, 134-2, 134-3 and 134-4 and the global wear-leveling manager 136 described above with reference to FIG. 1.

The host interface 132 may receive a request including a logical address from the host 102. The host interface 132 may distribute the request to the cores 134-1, 134-2, 134-3 and 134-4 based on the logical address of the request. For example, the host interface 132 may provide the first core 134-1 with the request when a result value obtained by performing a modulo 4 operation on the logical address ("LBA %4") is "1", provide the second core 134-2 with the request when the result value is "2", provide the third core 134-3 with the request when the result value is "3", and provide the fourth core 134-4 with the request when the result value is "0".

A plurality of physical blocks and a plurality of super blocks may be allocated to each of the cores 134-1, 134-2, 134-3 and 134-4. Each of the super blocks may be mapped to one or more physical blocks. For example, the cores 134-1, 134-2, 134-3 and 134-4 may group blocks, which can be accessed in parallel among the plurality of physical blocks, into a super block, and access and manage the grouped blocks in units of super blocks.

In an initial state before the global wear-leveling operation is performed in the memory system 110, super blocks of the first core 134-1 may be mapped to physical blocks of the first memory device 150-1. Similarly, super blocks of the second to fourth cores 134-2, 134-3 and 134-4 may be mapped to physical blocks included in the second to fourth memory devices 150-2, 150-3 and 150-4, respectively. Hereinafter, a super block allocated to the first core 134-1 is referred to as a first super block, and a super block allocated to the second core 134-2 is referred to as a second super block. In addition, a physical block allocated to the first memory device 150-1 is referred to as a first physical block, and a physical block allocated to the second memory device 150-2 is referred to as a second physical block.

Each of the cores 134-1, 134-2, 134-3 and 134-4 may perform the local wear-leveling operation on the super blocks allocated to itself. For example, when the difference between the degrees of wear of the first super blocks is equal to or greater than a threshold value, the first core 134-1 may move data, which is stored in the least worn first super block, to the most worn first super block.

The degrees of wear of the super blocks may be determined by an erase count. For example, the first core 134-1 may count the erase numbers of the first super blocks to determine the degrees of wear of the super blocks. The erase counts of the super blocks may be determined by the erase counts of physical blocks mapped to the super blocks.

The first core 134-1 may arrange, in a free block queue, free blocks from the lowest erase count to the highest erase count among the first super blocks. In FIG. 3, super blocks queued to the free block queue are represented by reference symbol "SB". The free blocks may not be currently storing any data. The erase count of each of the super blocks and the free block queue may be stored in the first memory 144-1, however, the first memory 144-1 is omitted from FIG. 3. Among super blocks assigned to the same core, a super block having the highest erase count is referred to as a local maximum super block and a super block having the lowest erase count is referred to as a local minimum super block.

The first core 134-1 may transfer and store data of the local minimum super block into the local maximum super block when the difference between the erase counts of the local maximum super block and the local minimum super block exceeds a threshold value, and make the local minimum super block be frequently used by allowing user data to be stored in the local minimum super block. In FIG. 3, the local maximum super block is represented by a background super block (BGSB), and the local minimum super block is represented by a foreground super block (FGSB).

Similarly, each of the second to fourth cores 134-2, 134-3 and 134-4 may count the erase numbers of super blocks allocated to itself, generate free block queues, and perform the local wear-leveling operation. The free block queues of the third and fourth cores 134-3 and 134-4 are omitted from FIG.

According to an embodiment, the global wear-leveling manager 136 may perform the global wear-leveling operation of swapping physical blocks allocated to different cores when the degrees of wear of super blocks allocated to the different cores are not balanced. For example, the global wear-leveling manager 136 may swap a physical block having the highest erase count, among physical blocks allocated to a core having the highest frequency of request performance, for a physical block having the lowest erase count, among physical blocks allocated to a core having the lowest frequency of request performance.

When the global wear-leveling manager 136 performs the global wear-leveling operation, the degrees of wear of the physical blocks included in the entire memory system 110 may be equalized or balanced even though the amount of requests from the host 102 for each logical address is different. According to the present embodiment, the lifespan of the memory system 110 may be improved because the memory system 110 may be used until all the physical blocks of the memory system 110 reach the end of their lifespans.

FIGS. 3 and 4 illustrate an example of the global wear-leveling operation with a case where the degrees of wear of the super blocks between the cores are not equalized because the first core 134-1 has the highest frequency of requests and the second core 134-2 has the lowest frequency of requests.

FIG. 4 illustrates the operation of the memory system 110 in accordance with an embodiment of the present invention.

In operation S401, the first core 134-1 may erase the first super block. In FIG. 3, the first super block to be erased is represented by "SBCLOSED" in the first core 134-1.

In operation S403, the first core 134-1 may determine whether the erased first super block is a super block having the highest erase count in the entire memory system 110. Hereinafter, the super block having the highest erase count in the entire memory system 110 is referred to as a global maximum super block. Since the degrees of wear of the super blocks allocated to the same core are maintained evenly by the local wear-leveling operation, the global maximum super block may be included in super blocks of a core having the largest amount of received requests.

When the first super block is the global maximum super block, the first core 134-1 may determine whether the difference in erase count between the global maximum super block and a super block having the lowest erase count in the entire memory system 110 is equal to or greater than a threshold value, in operation S405. Hereinafter, the super block having the lowest erase count in the entire memory system 110 is referred to as a global minimum super block. Depending on implementation, each of the cores 134-1, 134-2, 134-3 and 134-4 may store erase counts of the super blocks of the entire memory system 110 in the memory linked to each of the cores 134-1, 134-2, 134-3 and 134-4, and obtain the erase count of the global minimum super block from the erase counts. The global minimum super block may be included in super blocks of a core having the smallest amount of received requests. In the examples of FIGS. 3 and 4, the global minimum super block may be included in super blocks allocated to the second core 134-2.

When the difference between the erase counts of the global maximum super block and the global minimum super block is equal to or greater than the threshold value, the global wear-leveling manager 136 may perform the global wear-leveling operation of operations S407, S409, S411, S413 and S415.

In operation S407, the first core 134-1 may request the global wear-leveling operation from the global wear-leveling manager 136.

In operation S409, the global wear-leveling manager 136 may request the global minimum super block from the second core 134-2.

When data is stored in the global minimum super block, the second core 134-2 may move and store the data into the super block having the highest erase count among the second super blocks, that is, the local maximum super block, and erase the global minimum super block, in operation S411. In FIG. 3, the global minimum super block is represented by "SBCLOSED" in the second core 134-2. In operation S413, the second core 134-2 may provide the global wear leveling manager 136 with a response to the request of operation S409.

In operation S415, the global wear-leveling manager 136 may swap the physical blocks, which are mapped to the global maximum super block, for the physical blocks, which are mapped to the global minimum super block. That is, the global wear-leveling manager 136 may map the physical blocks, which are mapped to the global maximum super block, to the global minimum super block, and map the physical blocks, which are mapped to the global minimum super block, to the global maximum super block. The physical blocks having the highest erase count in the entire memory system 110, which have been accessed by the first core 134-1, may be accessed by the second core 134-2 hereafter. In addition, the physical blocks having the lowest erase count in the entire memory system 110, which have been accessed by the second core 134-2, may be accessed by the first core 134-1 hereafter.

When the global wear-leveling manager 136 swaps the physical blocks, the global maximum super block included in the first core 134-1 may be changed to the global minimum super block, and the global minimum super block included in the second core 134-2 may be changed to the global maximum super block. This is because the erase count of the super block may be determined according to the erase counts of the physical blocks mapped to the super block.

The global maximum super block may be rarely used by the second core 134-2 when the second core 134-2 tends to maintain the lowest frequency of request performance. The global minimum super block may be frequently used by the first core 134-1 when the first core 134-1 tends to maintain the highest frequency of request performance. Accordingly, the degrees of wear of the super blocks and physical blocks of the entire memory system 110 may be balanced.

Figure 5:
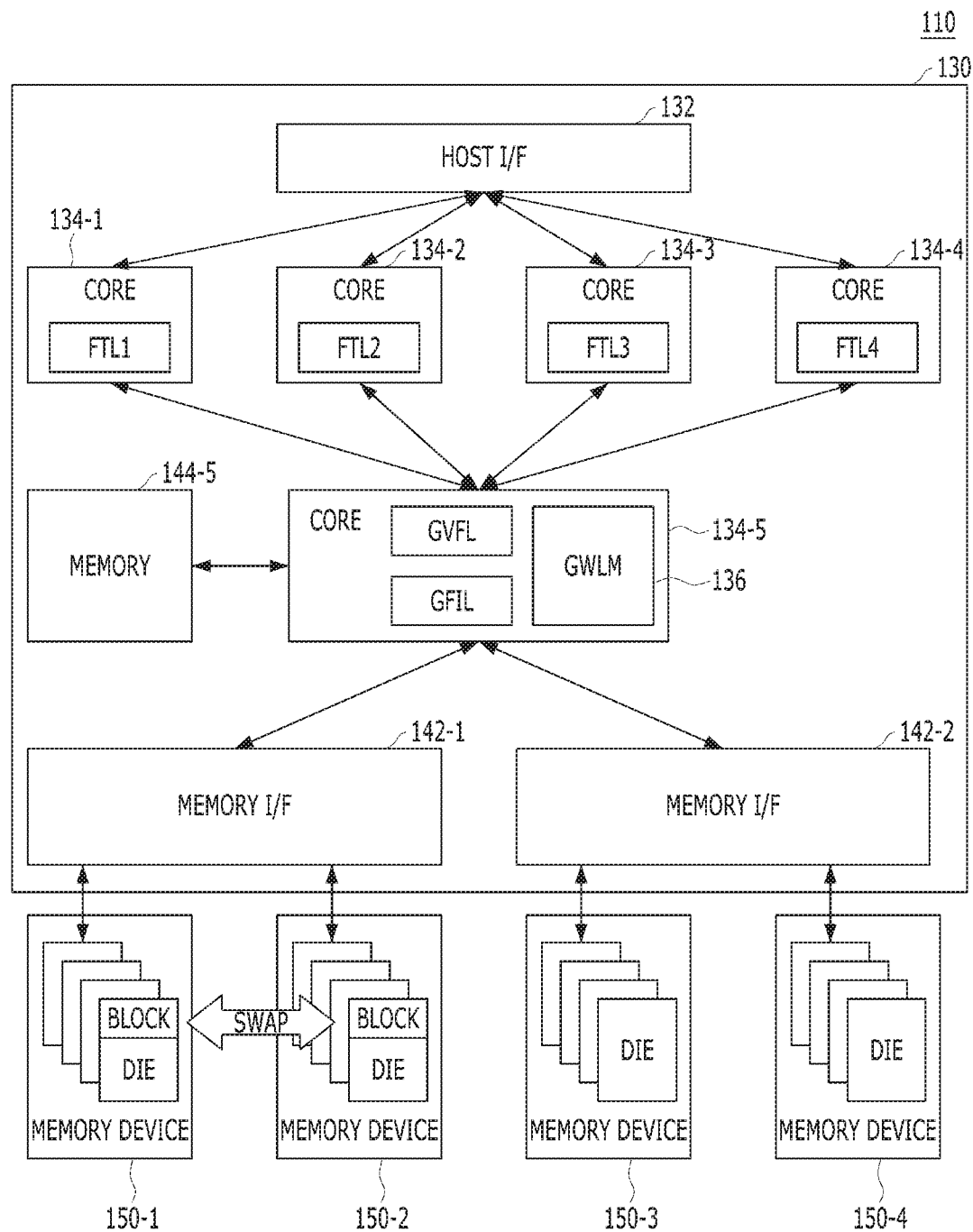
FIG. 5 is a block diagram illustrating a structure of a memory system in accordance with a first embodiment.

FIG. 5 is a block diagram illustrating a structure of a memory system 110 in accordance with a first embodiment of the present invention.

Figure 6A:
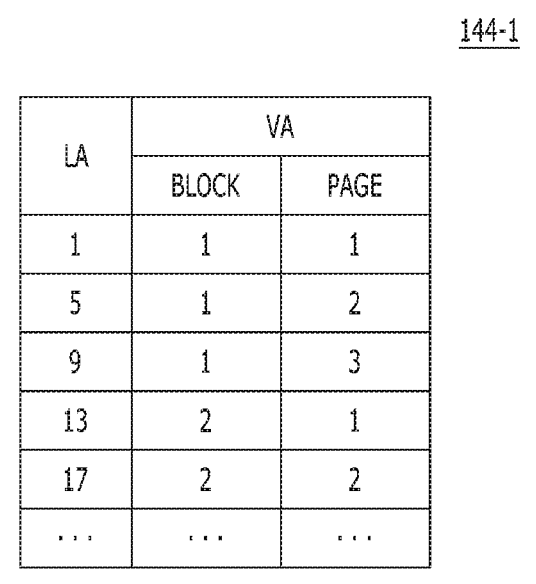
Figure 6C:
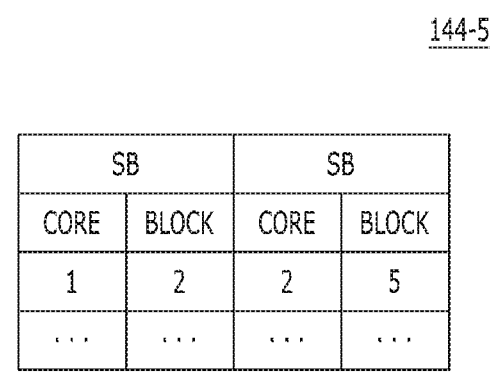

FIGS. 6A to 6C are examples of address mapping tables of the memory system 110 illustrated in FIG. 5.

The memory system 110 illustrated in FIG. 5 may further include a fifth core 134-5 and a fifth memory 144-5 in the memory system 110 illustrated in FIG. 1. The memory system 110 illustrated in FIG. 5 may include a plurality of memories 144-1, 144-2, 144-3 and 144-4, however, the memories 144-1, 144-2, 144-3 and 144-4 are omitted from the drawing.

A host interface 132 may drive an HIL. As described with reference to FIGS. 1 and 3, the HIL may distribute a request, which is received from a host 102, to a plurality of cores 134-1, 134-2, 134-3 and 134-4 based on logical addresses associated with the request.

First to fourth cores 134-1, 134-2, 134-3 and 134-4 may drive FTLs. In FIG. 5, the FTLs driven, respectively, by the first to fourth cores 134-1, 134-2, 134-3 and 134-4 are represented by a first FTL FTL1, a second FTL FTL2, a third FTL FTL3 and a fourth FTL FTL4, respectively.

Each of the FTLs may translate logical addresses, which are used in a file system of the host 102, into virtual addresses. The virtual addresses may be addresses indicating the super block described above with reference to FIG. 3. The respective FTLs may store mapping tables indicating mapping between the logical addresses and the virtual addresses in the memories 144-1, 144-2, 144-3 and 144-4.

FIG. 6A is an example of a logical to virtual (L2V) mapping table stored in the first memory 144-1.

The L2V mapping table stored in the first memory 144-1 may include mapping of the virtual address VA for each logical address LA associated with the first core 134-1. In the present embodiment, since the first core 134-1 performs only a request associated with logical addresses whose result values of a modulo 4 operation are "1", the L2V mapping table may include only the logical addresses whose result values are "1". In addition, the L2V mapping table may include only virtual addresses for first super blocks allocated to the first core 134-1.

Referring back to FIG. 5, each of the FTLs may manage super blocks mapped to physical blocks. For example, each of the FTLs may perform a local wear-leveling operation based on erase counts of the super blocks.

The fifth core 134-5 may include a global virtual flash layer (GVFL), a global flash interface layer (GFIL) and the global wear-leveling manager (GWLM) 136.

The GVFL may perform mapping between the virtual addresses and the physical addresses of the entire memory system 110. The GVFL may map normal physical blocks excluding defective physical blocks to super blocks. The GVFL may store a table, indicating mapping between the virtual addresses and the physical addresses, in the fifth memory 144-5.

FIG. 6B provides an example of a V2P mapping table stored in the fifth memory 144-5. The V2P mapping table stored in the fifth memory 144-5 may include mapping between super blocks SB allocated to the cores 134-1, 134-2, 134-3 and 134-4 and physical blocks PB stored in a plurality of memory devices 150-1, 150-2, 150-3 and 150-4. Each of the super blocks SB may be mapped to the physical blocks PB that are operable in parallel with one another. FIG. 6B provides an example of a case where one super block SB is mapped to physical blocks PB included in four memory dies DIE1, DIE2, DIE3 and DIE4. For example, a first super block of the first core 134-1 may be mapped to the physical blocks included in the four memory dies DIE1, DIE2, DIE3 and DIE4 of the first memory device 150-1.

According to an embodiment, the GVFL may further perform an operation of storing parity data in a part of a super block in preparation for a chipkill that may occur in the memory device.

Referring back to FIG. 5, the GFIL may generate a command to be provided to the memory device, based on a physical address translated by the GVFL. For example, the GFIL may generate a program command, a read command and an erase command for the physical blocks of the memory devices 150-1, 150-2, 150-3 and 150-4.

The global wear-leveling manager 136 may perform a global wear-leveling operation by changing the mapping between the virtual addresses and the physical addresses stored in the fifth memory 144-5.

Referring back to FIG. 6B, each of super blocks allocated to the first core 134-1 before the global wear-leveling operation is performed may be mapped to the physical blocks of the first memory device 150-1, and each of super blocks allocated to the second core 134-2 may be mapped to the physical blocks of the second memory device 150-2.

The dotted lines illustrated in FIG. 6B represent mapping between super blocks and physical blocks swapped by the global wear-leveling operation. When the global wear-leveling operation is performed, some of the super blocks allocated to the first core 134-1 may be mapped to the physical blocks of the memory device other than the first memory device 150-1. FIG. 66 provides an example of a case where a second super block ("2" in "BLOCK" field) of the first core 134-1 is mapped to the physical blocks ("5", "5", "4" and "5" in respective "DIE1" to "DIE4" fields) of the second memory device 150-2 ("2" in "DEVICE" field), and a fifth super block ("5" in "BLOCK" field) of the second core 134-2 is mapped to the physical blocks ("2", "2", "2" and "2" in respective "DIE1" to "DIE4" fields) of the first memory device 150-1 ("1" in "DEVICE" field), through the global wear-leveling operation. That is, the exclusive assignments of the second and fifth super blocks may be exchanged between the first and second cores 134-1 and 134-2 through the global wear-leveling operation according to an embodiment.

According to an embodiment, the fifth memory 144-5 may further store a swap information table including information of the physical blocks swapped among the cores 134-1, 134-2, 134-3 and 134-4, FIG. 6C provides an example of the swap information table that is storable in the fifth memory 144-5.

In the example of FIG. 6C, the swap information table may represent a state where physical blocks mapped to the second super block of the first core 134-1 are swapped for physical blocks mapped to the fifth super block of the second core 134-2 through the global wear-leveling operation. When the physical blocks are swapped, the degrees of wear of the super blocks allocated to the first and second cores 134-1 and 134-2 may be balanced.

According to an embodiment, the global wear-leveling manager 136 may restore the mapping after the swapping between the virtual blocks and the physical blocks to the mapping before the swapping therebetween, with reference to the swap information table when the degrees of wear of the super blocks among the cores 134-1, 134-2, 134-3 and 134-4 are balanced. For example, the global wear-leveling manager 136 may determine that when the erase counts of the super blocks among the cores 134-1, 134-2, 134-3 and 134-4 are less than a threshold value, the degrees of wear thereof are balanced and restore the mapping between the virtual blocks and the physical blocks. In the example of FIG. 6C, in order to restore the mapping between the virtual blocks and the physical blocks, the global wear-leveling manager 136 may map the physical blocks, which are mapped to the second super block of the first core 134-1, to the fifth super block of the second core 134-2, map the physical blocks, which are mapped to the fifth super block of the second core 134-2, to the second super block of the first core 134-1, and remove the second super block of the first core 134-1 and the fifth super block of the second core 134-2 from the swap information table.

Referring back to FIG. 5, the memory system 110 may further include one or more hardware accelerators (not illustrated) to improve calculation processing performance of the fifth core 134-5. As a first example, the hardware accelerators may queue commands provided from the plurality of FTLs to the GVFL, thereby rapidly receiving commands provided from the first to fourth cores 134-1, 134-2, 134-3 and 134-4 to the fifth core 134-5. As a second example, the hardware accelerators may schedule commands outputted from the GFIL to a plurality of memory interfaces 142-1 and 142-2, thereby processing the commands in parallel in the memory devices 150-1, 150-2, 150-3 and 150-4.

The memory interfaces 142-1 and 142-2 may control the memory devices 150-1, 150-2, 150-3 and 150-4 based on the commands received from the GFIL. The memory interfaces 142-1 and 142-2 have been described in detail with reference to FIG. 1.

Figure 7:
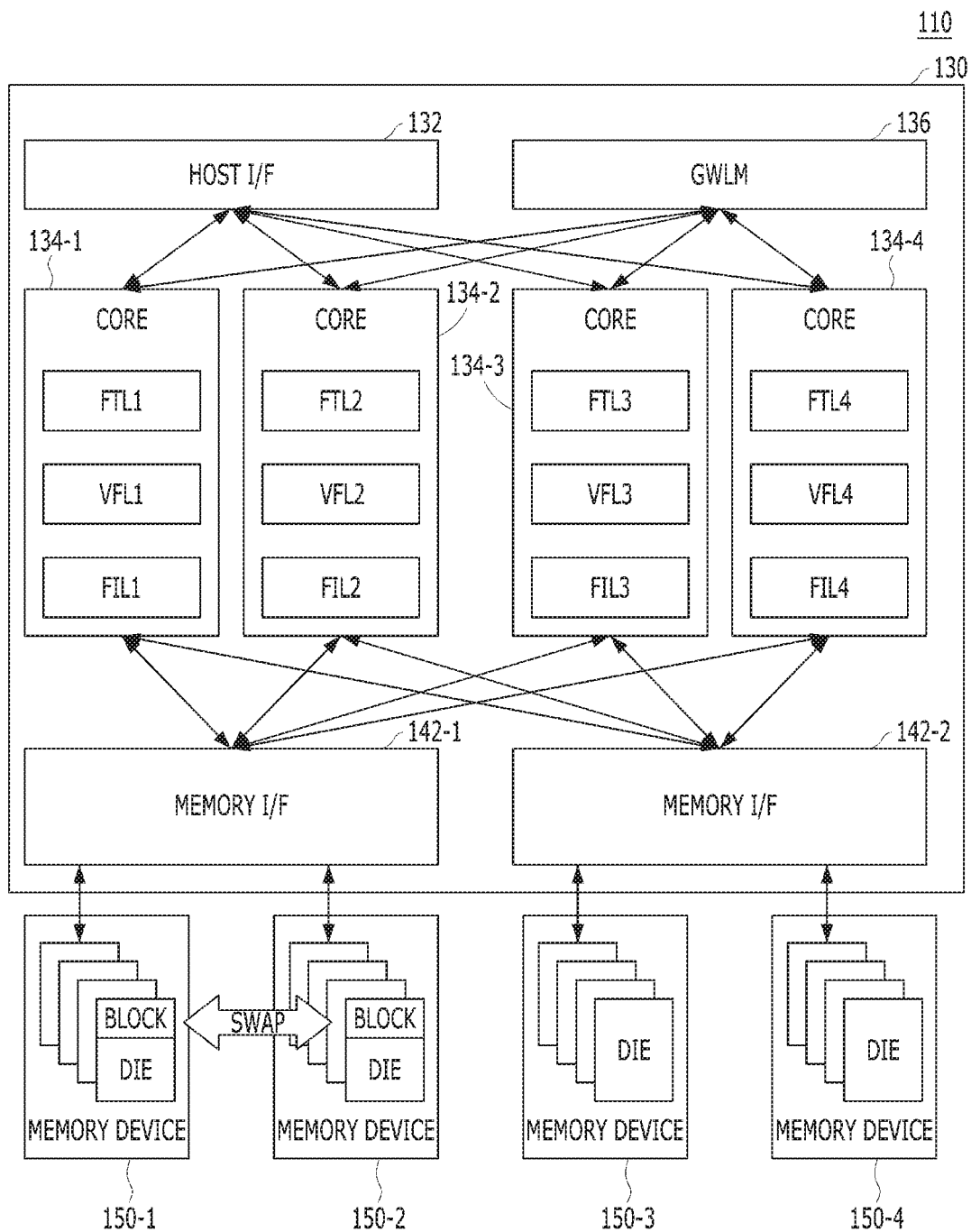
FIG. 7 is a block diagram illustrating a structure of a memory system in accordance with a second embodiment.

FIG. 7 is a block diagram illustrating a structure of a memory system 110 in accordance with a second embodiment of the present invention.

FIG. 8 is an example of an address mapping table of the memory system 110 illustrated in FIG. 7.

The memory system 110 illustrated in FIG. 7 may correspond to the memory system 110 illustrated in FIG. 1. The memory system 110 illustrated in FIG. 7 may include a plurality of memories 144-1, 144-2, 144-3 and 144-4, however, the memories 144-1, 144-2, 144-3 and 144-4 are omitted from the drawing.

The host interface 132 may drive an HIL. The HIL may distribute a request, which is received from the host 102, to a plurality of cores 134-1, 134-2, 134-3 and 134-4 based on logical addresses associated with the request.

Each of the cores 134-1, 134-2, 134-3 and 134-4 may drive an FTL, a virtual flash layer (VFL) and a flash interface layer (FIL).

In FIG. 7, the FTLs driven by the cores 134-1, 134-2, 134-3 and 134-4 are represented by a first FTL FTL1, a second FTL FTL2, a third FTL FTL3 and a fourth FTL FTL4, respectively.

Each of the H Ls may translate logical addresses to virtual addresses. The FTLs according to the second embodiment may perform a substantially similar operation to the FTLs according to the first embodiment described above with reference to FIG. 5. For example, the first FTL included in the first core 134-1 may store a table, which is substantially similar to the L2V mapping table described above with reference to FIG. 6A, in the first memory 144-1. In addition, each of the FTLs may perform a local wear-leveling operation.

In FIG. 7, the VFLs driven by the cores 134-1, 134-2, 134-3 and 134-4 are represented by a first VFL VFL1, a second VFL FVL2, a third VFL VFL3 and a fourth VFL VFL4, respectively.

Each of the VFLs may translate virtual addresses into physical addresses. For example, the first VFL may translate the virtual addresses, indicating super blocks allocated to the first core 134-1, into the physical addresses. Each of the VFLs may store a V2P mapping table, indicating mapping between the virtual addresses and the physical addresses, in a corresponding memory.

FIG. 8 provides an example of the V2P mapping table stored in the first memory 144-1. The V2P mapping table stored in the first memory 144-1 may include super blocks SB allocated to the first core 134-1 and physical blocks PB mapped to the super blocks SB. Similarly, the second to fourth memories 144-2, 144-3 and 144-4 may store the V2P mapping tables associated with the super blocks SB allocated to the second to fourth cores 134-2, 134-3 and 134-4, respectively. FIG. 8 provides an example of a case where one super block is mapped to the physical blocks included in four memory dies DIE1, DIE2, DIE3 and DIE4.

According to an embodiment, each of the VFLs may further perform an operation of storing parity data in a part of a super block in preparation for a chipkill that may occur in the memory device.

Referring back to FIG. 7, each of the FILs may generate a command to be provided to the memory device, based on the physical addresses translated by the VFL included in the same core. In FIG. 7, the FILs driven by the cores 134-1, 134-2, 134-3, and 134-4 are represented by a first FIL FIL1, second FIL FIL2, third FIL FIL3 and fourth FIL FIL4, respectively. For example, the first FIL may generate a program command, a read command, and an erase command for physical blocks allocated to the first core 134-1. According to the present embodiment, the first FIL is not limited to generating a command for physical blocks of the first memory device 150-1, and may generate commands for physical blocks of the second to fourth memory devices 150-2, 150-3 and 150-4 according to a global wear-leveling operation. Similarly, the second to fourth FILs may generate commands for controlling the first to fourth memory devices 150-1, 150-2, 150-3 and 150-4 according to physical blocks allocated to the cores including the second to fourth FILs, respectively.

A global wear-leveling manager 136 may control the cores 134-1, 134-2, 134-3, and 134-4 to access the memories 144-1, 144-2, 144-3 and 144-4. The global wear-leveling manager 136 may perform the global wear-leveling operation by changing V2P mapping stored in the memories 144-1, 144-2, 144-3 and 144-4.

Referring back to FIG. 8, each of the super blocks allocated to the first core 134-1 before the global wear-leveling operation is performed may be mapped to the physical blocks of the memory dies DIE1, DIE2, DIE3 and DIE4 of the first memory device 150-1. The portion in the dotted box of FIG. 8 represents a case where the second super block of the first core 134-1 is mapped to the physical blocks of the second memory device 150-2 through the global wear-leveling operation.

According to an embodiment, the memory system 110 may further include a sixth memory (not illustrated) for storing data necessary for driving the global wear-leveling manager 136. The global wear-leveling manager 136 may further store a swap information table including information of physical blocks swapped between the cores. The swap information table is substantially similar to that described above with reference to FIG. 6C.

According to an embodiment, the global wear-leveling manager 136 may restore the mapping after the swapping between virtual blocks and physical blocks to the mapping before the swapping therebetween, with reference to the swap information table when the degrees of wear of the super blocks between the cores 134-1, 134-2, 134-3 and 134-4 are balanced. The swapped physical blocks may be swapped again, and the information of the physical blocks stored in the swap information table may be removed.

A plurality of memory interfaces 142-1 and 142-2 may control the memory devices 150-1, 150-2, 150-3 and 150-4 based on commands received from the plurality of FILs. The memory interfaces 142-1 and 142-2 have been described in detail with reference to FIG. 1.

The memory system 110 described with reference to FIGS. 1 to 8 may include the first memory device 150-1, the second memory device 150-2, the first core 134-1, the second core 134-2, the global wear-leveling manager 136 and the host interface 132.

The first memory device 150-1 may include the plurality of first physical blocks, and the second memory device 150-2 may include the plurality of second physical blocks. Each of the first super blocks allocated to the first core 134-1 may be mapped to the plurality of physical blocks among the plurality of first physical blocks, and each of the second super blocks allocated to the second core 134-2 may be mapped to the plurality of physical blocks among the plurality of second physical blocks.

The global wear-leveling manager 136 may swap the first physical blocks, which are mapped to the first super block, for the second physical blocks, which are mapped to the second super block, based on the degrees of wear of the first and second super blocks. For example, the global wear-leveling manager 136 may swap physical blocks mapped between the global maximum super block included in the core having the highest frequency of request performance and the global minimum super block included in the core having the lowest frequency of request performance.

The host interface 132 may distribute the logical addresses, which are received from the host 102, to the first core 134-1 and the second core 134-2. For example, the host interface 132 may sort the logical addresses into first and second logical addresses according to a predetermined operation, provide the first core 134-1 with the first logical address, and provide the second core 134-2 with the second logical address.

When the first core 134-1 receives the first logical address from the host interface 132, the first core 134-1 may search for a super block corresponding to the first logical address and physical blocks mapped to the super block.

According to the embodiments of the present disclosure, the degrees of wear of the physical blocks included in the entire memory system 110 are equalized or balanced, thereby improving the lifespan of the memory system 110.

According to the embodiments of the present disclosure, it is possible to provide a controller and a memory system which may equalize or balance the degrees of wear of memory blocks included in different memory devices.

According to the embodiments of the present disclosure, it is possible to provide a controller and a memory system which may improve the lifespans of a plurality of memory devices by evenly using all memory blocks included in the memory devices.

These effects obtainable in the present disclosure are not limited to the embodiments described above, and other effects not described herein will be apparently understood by those skilled in the art to which the present disclosure pertains from the above detailed description.

While the present disclosure has been described with respect to specific embodiments, it will be apparent to those skilled in the art that various changes and modifications may be made without departing from the spirit and scope of the disclosure as defined in the following claims.

What is claimed is:
1. A memory system comprising:
a first memory device including a plurality of first physical blocks;
a second memory device including a plurality of second physical blocks;
a first core suitable for managing a plurality of first super blocks that store data associated with a first logical address, the plurality of first super blocks being mapped to the plurality of first physical blocks;
a second core suitable for managing a plurality of second super blocks that store data associated with a second logical address, the plurality of second super blocks being mapped to the plurality of second physical blocks;
a global wear-leveling manager suitable for changing address mapping from a first physical block of the first physical blocks, which are mapped to one among the first super blocks by the first core, to a second physical block of the second physical blocks, which are mapped to one among the second super blocks by the second core, or vice versa, based on degrees of wear of the first and second super blocks;
a host interface suitable for sorting logical addresses, which are received from a host, into the first and second logical addresses, providing the first core with the first logical address, and providing the second core with the second logical address;
a global virtual flash layer (VFL) that performs mapping a first virtual address and a second virtual address to physical addresses associated with the first physical block and the second physical block, wherein the first core drives a first local flash translation layer (FTL) that performs mapping between the first virtual address, which is an address of the first super blocks, and the first logical address, and the second core drives a second local FTL that performs mapping between the second virtual address, which is an address of the second super blocks, and the second logical address;
a first hardware accelerator suitable for queuing a command provided from the first and second local FTLs to the global VFL; and
a second hardware accelerator suitable for scheduling commands provided from the first core and the second core to the first memory device and the second memory device.

2. The memory system of claim 1, wherein the degrees of wear of the super blocks are determined by erase counts of the physical blocks mapped to the super blocks.

3. The memory system of claim 2,
wherein the global wear-leveling manager changes the mapping of the first physical blocks and the second physical blocks between the corresponding first and second super blocks when
the corresponding first super block is a global maximum super block,
the corresponding second super block is a global minimum super block and
a difference between the degrees of wear of the corresponding first and second super blocks is equal to or greater than a threshold value,
wherein the global maximum super block has the highest degree of wear among all of the first and second super blocks, and
wherein the global minimum super block has the lowest degree of wear among all of the first and second super blocks.

4. The memory system of claim 3, wherein the global wear-leveling manager restores, when the difference between the degrees of wear of the corresponding first and second super blocks become less than the threshold value, the changed mapping to the mapping before the mapping was changed.

5. The memory system of claim 1,
wherein the first core drives a first local FTL that performs mapping between the first logical address and a first virtual address associated with the first super blocks, and drives a first local VFL that performs mapping between the first virtual address and a physical address, and
wherein the second core drives a second local FTL that performs mapping between the second logical address and a second virtual address associated with the second super blocks, and drives a second local VFL that performs mapping between the second virtual address and a physical address.

6. The memory system of claim 1,
wherein the first core performs a local wear-leveling operation of moving data between the first super blocks based on the degrees of wear of the first super blocks, and
wherein the second core performs a local wear-leveling operation of moving data between the second super blocks based on the degrees of wear of the second super blocks.

7. A controller that controls a first memory device and a second memory device, the controller comprising:
a first core suitable for managing a plurality of first super blocks that store data associated with a first logical address, the plurality of first super blocks being mapped to a plurality of first physical blocks included in the first memory device;
a second core suitable for managing a plurality of second super blocks that store data associated with a second logical address, the plurality of second super blocks being mapped to a plurality of second physical blocks included in the second memory device;
a global wear-leveling manager suitable for swapping a first physical block of the first physical blocks, which are mapped to one among the first super blocks by the first core, for a second physical block of the second physical blocks, which are mapped to one among the second super blocks by the second core, or vice versa, based on degrees of wear of the first and second super blocks;
a host interface suitable for sorting logical addresses, which are received from a host, into the first logical address and the second logical address, providing the first core with the first logical address, and providing the second core with the second logical address;
a global virtual flash layer (VFL) that performs mapping a first virtual address and a second virtual address to physical addresses associated with the first physical block and the second physical block, wherein the first core drives a first local flash translation layer (FTL) that performs mapping between the first virtual address, which is an address of the first super blocks, and the first logical address, and the second core drives a second local FTL that performs mapping between the second virtual address, which is an address of the second super blocks, and the second logical address;
a first hardware accelerator suitable for queuing a command provided from the first and second local FTLs to the global VFL; and
a second hardware accelerator suitable for scheduling commands provided from the first core and the second core to the first memory device and the second memory device.

8. The controller of claim 7, wherein the degrees of wear of the super blocks are determined by erase counts of the physical blocks mapped to the super blocks.

9. The controller of claim 8,
wherein the global wear-leveling manager changes mapping of the first physical blocks and the second physical blocks between the corresponding first and second super blocks when the corresponding first super blocks is a global maximum super block,
the corresponding second super block is a global minimum super block and
a difference between the degrees of wear of the corresponding first and second super blocks is equal to or greater than a threshold value,
wherein the global maximum super block has the highest degree of wear among all of the first and second super blocks, and
wherein the global minimum super block has the lowest degree of wear among all of the first and second super blocks.

10. The controller of claim 9, wherein the global wear-leveling manager restores, when the difference between the degrees of wear of the corresponding first and second super blocks become less than the threshold value, the changed mapping to the mapping before the mapping was changed.

11. The controller of claim 7,
wherein the first core drives a first local FTL that performs mapping between the first logical address and a first virtual address associated with the first super blocks, and drives a first local VFL that performs mapping between the first virtual address and a physical address, and
wherein the second core drives a second local FTL that performs mapping between the second logical address and a second virtual address associated with the second super blocks, and drives a second local VFL that performs mapping between the second virtual address and a physical address.

12. The controller of claim 7,
wherein the first core performs a local wear-leveling operation of moving data between the first super blocks based on the degrees of wear of the first super blocks, and
wherein the second core performs a local wear-leveling operation of moving data between the second super blocks based on the degrees of wear of the second super blocks.

13. A memory system comprising:
a plurality of memory devices including first and second groups of memory units, the first and second groups being exclusively and individually used by a first core and a second core;
the first core and the second core individually allocating the first and second groups for storing data;
a global wear-leveling manager suitable for exchanging, based on degrees of wear of the respective memory units, a first memory unit of the first group allocated by the first core with a second memory unit of the second group allocated by the second core, or vice versa;
a global virtual flash layer (VFL) that performs mapping a first virtual address and a second virtual address to physical addresses associated with a first physical memory unit in the first group and a second physical memory unit in the second group, wherein the first core drives a first local flash translation layer (FTL) that performs mapping between the first virtual address, which is an address of first super memory units, and the first logical address, and the second core drives a second local FTL that performs mapping between the second virtual address, which is an address of second super memory units, and the second logical address;

a first hardware accelerator suitable for queuing a command provided from the first local FTL and the second local FTL to the global VFL; and a second hardware accelerator suitable for scheduling commands provided from the first core and the second core to the first memory device and the second memory device.

14. The memory system according to claim 13, wherein the global wear-leveling manager changes mapping between a logical address associated with the data and a physical address associated with the first memory unit or the second memory unit to exchange the first memory unit and the second memory unit.

* * * * *